United States Patent
Kuga et al.

(10) Patent No.: US 10,059,292 B2
(45) Date of Patent: Aug. 28, 2018

(54) OBSTRUCTION DETECTION METHOD FOR MOBILE BODY, SYSTEM FOR SAME, MOBILE BODY, STRUCTURAL MEMBER AND BUMPER

(71) Applicant: Sharp Kabushiki Kaisha, Sakai, Osaka (JP)

(72) Inventors: Tohru Kuga, Sakai (JP); Masaru Ogawa, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 34 days.

(21) Appl. No.: 15/126,303

(22) PCT Filed: Aug. 26, 2014

(86) PCT No.: PCT/JP2014/072330
§ 371 (c)(1),
(2) Date: Sep. 15, 2016

(87) PCT Pub. No.: WO2015/145803
PCT Pub. Date: Oct. 1, 2015

(65) Prior Publication Data
US 2017/0080886 A1    Mar. 23, 2017

(30) Foreign Application Priority Data

Mar. 26, 2014  (JP) ................................. 2014-063784

(51) Int. Cl.
*B60R 19/48* (2006.01)
*G01S 17/93* (2006.01)
(Continued)

(52) U.S. Cl.
CPC .......... *B60R 19/483* (2013.01); *G01S 17/026* (2013.01); *G01S 17/08* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,779,289 A | * | 7/1998 | Alexander, Jr. | ......... B60R 19/12 280/759 |
| 2010/0225460 A1 | * | 9/2010 | Watanabe | ............. B60R 19/483 340/436 |
| 2014/0200773 A1 | * | 7/2014 | Wellhoefer | ......... B60R 21/0134 701/45 |

FOREIGN PATENT DOCUMENTS

| JP | 2002-104108 A | 4/2002 |
|---|---|---|
| JP | 2005-235048 A | 9/2005 |

(Continued)

OTHER PUBLICATIONS

Official Communication issued in International Patent Application No. PCT/JP2014/072330, dated Dec. 9, 2014.

*Primary Examiner* — Kerri McNally
*Assistant Examiner* — Cal Eustaquio
(74) *Attorney, Agent, or Firm* — Keating & Bennett, LLP

(57) ABSTRACT

In an unmanned carrier (100) including a grating-shaped bumper (10) having elasticity and an LRF (15) having a light-emitting unit and a light-receiving unit, a common processing system performs first detection processing that detects existence of an obstruction based on light applied from the light-emitting unit to a surrounding irradiated object and reflected from the irradiated object and second detection processing that detects contact of the obstruction with the unmanned carrier (100) by determining, based on light applied from the light-emitting unit to the grating-shaped bumper (10) and reflected from the grating-shaped bumper (10), presence or absence of deformation of the grating-shaped bumper (10).

8 Claims, 13 Drawing Sheets

(51) Int. Cl.
  *G01S 17/02* (2006.01)
  *G01S 17/08* (2006.01)
  *G01S 17/42* (2006.01)
  *G01S 17/88* (2006.01)
  *G01S 17/87* (2006.01)

(52) U.S. Cl.
  CPC .............. *G01S 17/42* (2013.01); *G01S 17/88* (2013.01); *G01S 17/936* (2013.01); *G01S 17/87* (2013.01); *G05D 2201/0216* (2013.01)

(56) References Cited

FOREIGN PATENT DOCUMENTS

| | | |
|---|---|---|
| JP | 2005-255044 A | 9/2005 |
| JP | 2006-164013 A | 6/2006 |
| JP | 2007-040737 A | 2/2007 |

\* cited by examiner

OBSTRUCTION DETECTION METHOD FOR MOBILE BODY, SYSTEM FOR SAME, MOBILE BODY, STRUCTURAL MEMBER AND BUMPER

TECHNICAL FIELD

The present invention relates to an obstruction detection method for a mobile body that detects existence of an obstruction in a traveling direction or around a mobile body and detects contact of the obstruction with the mobile body, and to a mobile body.

BACKGROUND ART

In facilities such as factories and warehouses, a self-propelled unmanned carrier is used, for example, to transport articles. Since such an unmanned carrier is not operated by any person, it has a mechanism for voluntarily detecting an obstruction on its route to avoid a collision with the obstruction.

For example, PTL 1 discloses an AGV (Automated Guided Vehicle) dolly provided with an obstruction detection sensor (obstruction detection device) including a light-emitting element and a light-receiving element. In the AGV dolly, when an obstruction exists at a predetermined distance from the obstruction detection sensor, the existence of the obstruction is detected by the obstruction detection sensor provided on a rotation shaft of wheels, and rotation of the rotation shaft by a driving device in the AGV dolly is stopped. Thus, detection of the obstruction is not delayed, the rotation can be immediately stopped, and a collision with the obstruction can be avoided.

PTL 2 discloses a bumper switch mounted on a bumper part of an unmanned carrier or the like to detect contact with an obstruction. In this bumper switch, side actuator plates are supported by their respective fulcrum members to be turned and displaced toward a switch element. For this reason, for example, when a side surface portion of the bumper switch comes into contact with an obstruction and pressure acts, the side actuator plates sensitively respond to the pressure, and are turned and displaced on the fulcrum members toward the switch element. Thus, the switch element is actuated, and the contact of the obstruction with the side surface portion can be detected accurately.

PTL 3 discloses a mobile device including an elastic member fixed to a side surface of a main body part having driving wheels, a bumper part that can be displaced in the horizontal direction by bending of the elastic member, a reflective photosensor that detects displacement of the bumper part in the horizontal direction in the body part, and a drive control part that detects a collision with an obstruction by analyzing a value detected by the reflective photosensor when the bumper part is displaced in the horizontal direction and controls a motor for driving the driving wheels so that the mobile device moves in a direction away from the obstruction.

As the obstruction detection sensor mounted in the AGV dolly described in PTL 1, for example, an LRF (Laser Range Finder) that detects an obstruction by scanning laser light frontward in the traveling direction is generally used to avoid a collision with then obstruction. In general, for the purpose of preventing a collision with an obstruction, the LRF is used to detect an obstruction existing on the route of the AGV by scanning laser light frontward in the traveling direction and to stop or decelerate the AGV, and is also used, for example, to detect the presence or absence of a free space in a warehouse or a storage space or to detect protrusion of an object. Thus, the LRF is a component that is highly important to traveling of the AGV.

The bumper switch described in PTL 2 is a component needed to reduce impact of contact when the unmanned carrier comes into contact with an obstruction or person suddenly appearing during traveling and to immediately stop the unmanned carrier upon detection of the contact.

CITATION LIST

Patent Literature

PTL 1: Japanese Unexamined Patent Application Publication No. 2006-164013 (published on Jun. 22, 2006)
PTL 2: Japanese Unexamined Patent Application Publication No. 2002-104108 (published on Apr. 10, 2002)
PTL 3: Japanese Unexamined Patent Application Publication No. 2005-235048 (published on Sep. 2, 2005)

SUMMARY OF INVENTION

Technical Problem

When an AGV, such as an unmanned carrier, is caused to travel in an unmanned manner, the techniques of PTL 1 and PTL 2 described above are both utilized, for example, to avoid the contact and to stop operation upon contact. In the following scenes, both of the techniques are utilized.

First, to avoid contact, a control/driving circuit (circuit A) is needed to stop or decelerate the AGV when the obstruction detection sensor described in PTL 1 detects a forward or surrounding obstruction. Secondly, for example, to stop operation upon contact, a control/driving circuit (circuit B) is also needed to immediately stop the AGV when the bumper switch described in PTL 2 detects contact with an obstruction or person suddenly appearing during traveling of the AGV.

The reflective photosensor (obstruction sensor) described in PTL 3 is a contact sensor that detects the contact of an obstruction or person with the bumper, similarly to the above-described bumper switch. For this reason, to detect a forward or surrounding obstruction and to measure, for example, the distance from the AGV to the obstruction during traveling of the AGV, it is necessary to add a non-contact sensor like the obstruction detection sensor described in PTL 1, besides the reflective photosensor. Therefore, when the unmanned carrier is caused to travel in an unmanned manner with the above-described reflective photosensor mounted therein, the sensor described in PTL 1 is also mounted and used to detect an obstruction in a non-contact manner.

Further, since the reflective photosensor described in PTL 3 is an optical sensor, it is conceivable to substitute the reflective photosensor for the obstruction detection sensor described in PTL 1 in order to reduce the number of sensors. However, since the reflective photosensor is a sensor that emits light downward and receives reflected light from the floor, it cannot also serve as the obstruction detection sensor described in PTL 1.

Therefore, to detect a forward or surrounding obstruction and to measure, for example, the distance from the mobile device to the obstruction during traveling in the mobile device described in PTL 3, it is necessary to add an LRF for those purposes. Accordingly, the circuits A and B are needed so that the mobile device has the above-described functions of, for example, object detection and distance measurement, similarly to the case in which the sensors described in PTL 1 and PTL 2 are both mounted, as described above.

FIG. 18 is a block diagram illustrating a configuration of a control system that stops an AGV in response to detection of existence of an obstruction and detection of contact with the obstruction in such a case.

In this control system, an LRF 1015 outputs a received signal when laser light L1 oscillated from the LRF 1015 receives reflected light R1 from an obstruction 1016 existing in the forward direction in a normal obstruction detecting operation. A received-signal detection circuit 1070 converts the received signal from the LRF 1015 into data (distance data) and stores the data in a storage unit 1090. Further, the storage unit 1090 prestores, as distance data (reference data) in each direction, the shape of the vehicle body of the AGV when there is no obstruction ahead of and around the AGV. The storage unit 1090 also prestores a predetermined range ahead of and around the vehicle body as an obstruction detection range. A body-operation control unit 1080 compares the reference data stored in the storage unit 1090 with the distance data acquired during traveling in each direction. When the acquired data includes a position inside the obstruction detection range where the distance is shorter than the reference data, the body-operation control unit 1080 determines that an obstruction exists at that position. In this way, the received signal from the LRF 1015 is fed back to the body-operation control unit 1080 via the received-signal detection circuit 1070 and the storage unit 1090. Thus, the body-operation control unit 1080 stops or decelerates the unmanned carrier as needed.

On the other hand, in the above-described control system, when a bumper 1010 comes into contact with any object or person, a detecting operation is caused in the bumper 1010 by the contact or collision with the bumper, as described in PTL 2 and PTL 3. At this time, contact information of the bumper 1010 is detected by a bumper-operation control/detection circuit 1020, and is fed back to the body-operation control unit 1080. Thus, the body-operation control unit 1080 stops the AGV.

In the above-described control system, the bumper-operation control/detection circuit 1020 and the received-signal detection circuit 1070 are both necessary, and, for example, a connection circuit part (not illustrated) for connecting the circuits is also necessary. Therefore, integrated circuits and programs that configure the control system are complicated.

The present invention has been made in view of the above-described problem, and an object of the invention is to simplify a structure for detecting existence of an obstruction to a mobile body and contact of the obstruction with the mobile body.

Solution to Problem

To solve the above-described problem, an obstruction detection method for a mobile body according to one mode of the present invention is an obstruction detection method for a mobile body by which a mobile body including a bumper having elasticity and an obstruction sensor configured to perform a detecting operation based on light that an irradiated object is irradiated with and light reflected from the irradiated object detects existence of an obstruction around the mobile body and contact of the obstruction with the mobile body. A common processing system performs first detection processing that detects the existence of the obstruction by determining, based on a detection output from the obstruction sensor, whether or not the irradiated object existing around the mobile body is an obstruction, and second detection processing that detects the contact of the obstruction with the mobile body by determining, based on a detection output from the obstruction sensor, presence or absence of deformation of the bumper when the bumper is specified as the irradiated object.

To solve the above-described problem, a mobile body according to another mode of the present invention is a mobile body that includes a bumper having elasticity and an obstruction sensor configured to perform a detecting operation based on light that an irradiated object is irradiated with and light reflected from the irradiated object and that detects existence of an obstruction around the mobile body and contact of the obstruction with the mobile body. The mobile body further includes a processing system configured to commonly perform first detection processing that detects the existence of the obstruction by determining, based on a detection output from the obstruction sensor, whether or not the irradiated object existing around the mobile body is an obstruction and second detection processing that detects the contact of the obstruction with the mobile body by determining, based on a detection output from the obstruction sensor, presence or absence of deformation of the bumper when the bumper is specified as the irradiated object.

Advantageous Effects of Invention

According to one mode and another mode of the present invention, in the first detection processing, the existence of an obstruction is detected by determining, based on light applied to the irradiated object and reflected light thereof, that the irradiated object is an obstruction. On the other hand, in the second detection processing, the contact of an obstruction with the mobile body is detected by determining, based on a detection output from the obstruction sensor when the bumper is deformed, that the bumper is deformed. Hence, unlike PTL 2, the function of the obstruction sensor itself can be utilized without providing a special actuator plate or switch element inside the bumper. In other words, the contact of the obstruction with the bumper can be detected by utilizing facility of a control/driving circuit. By performing the first detection processing and the second detection processing by the common processing system, the configuration of the processing system, including a control circuit, a driving circuit, and so on, for obstruction detection of the mobile body can be simplified.

DESCRIPTION OF EMBODIMENTS

Embodiments of the present invention will be described in detail below.

First Embodiment

A first embodiment of the present invention will be described as follows with reference to FIGS. 1 to 6.

Figure 1:
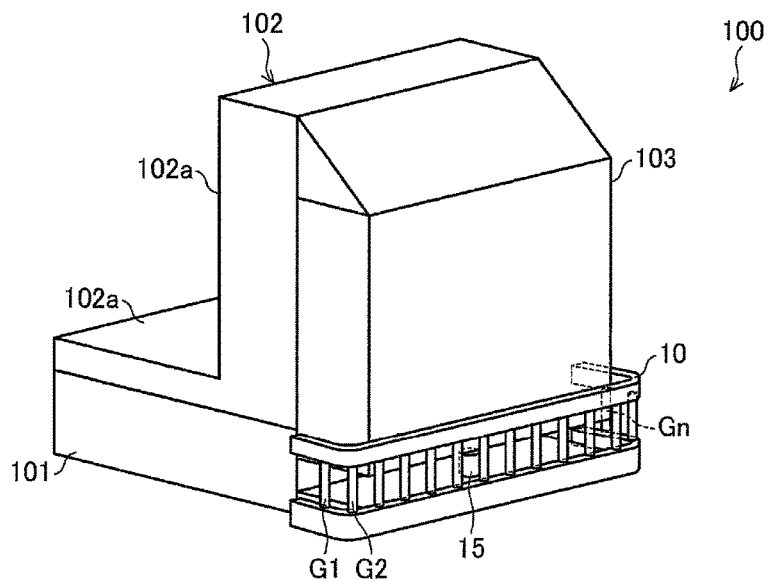
FIG. 1 is a perspective view illustrating a structure of an unmanned carrier according to a first embodiment of the present invention, as viewed from a front part side.

FIG. 1 is a perspective view illustrating an external structure of an unmanned carrier 100 according to a first embodiment of the present invention, as viewed from a side of a front part 103.

In the embodiments including this embodiment, it is assumed that a person is also treated as an obstruction to each unmanned carrier for convenience.

As illustrated in FIG. 1, the unmanned carrier 100 (mobile body) includes a base part 101, a body part 102, a front part 103, a grating-shaped bumper 10, and a laser range finder 15. Unillustrated wheels are provided on a lower surface of the base part 101. The unmanned carrier 100 can be moved by driving the wheels. The body part 102 is disposed on the base part 101, and includes a flat mounting table 102a on which an object to be transported is placed, and an upright portion 102b standing upright. The front part 103 is disposed on a front side of the upright portion 102b on the base part 101. The grating-shaped bumper 10 is disposed on a lower side of the front part 103 at the front of the base part 101.

The grating-shaped bumper 10 is a member formed of rubber-based elastic material, and includes grating members G1 to Gn (columnar members) arranged to form a grating. On the base part 101 on an inner side of the grating-shaped bumper 10, a laser range finder 15 (hereinafter referred to as an LRF) is disposed. The LRF 15 (obstruction sensor) is a sensor that emits laser light and detects existence of an obstruction on the basis of reflected light from the obstruction, and is used as an obstruction sensor in the unmanned carrier 100. The LRF 15 is also used as a contact sensor that optically detects deformation of the grating-shaped bumper 10 due to contact with the obstruction.

In normal obstruction detecting operation, the LRF 15 in the unmanned carrier 100 of this embodiment mainly emits laser light from spaces between the grating members G1 to Gn in the forward direction of the unmanned carrier 100 itself and toward an angle region (scan region) of 180° to 270° centered on the forward direction. Further, the LRF 15 performs an obstruction detecting operation by receiving reflected light from a forward obstruction existing inside the angle region that comes through the spaces between the grating members G1 to Gn, and measuring the distance to the obstruction, for example, on the basis of the phase difference between the emitted light and the received light or the time from light emission to light receiving.

On the other hand, the LRF 15 also receives light reflected by inner sides of the grating members G1 to Gn of the emitted light. When receiving reflected light in a state different from the normal state in which the grating members G1 to Gn are not deformed, for example, because one or some of the grating members G1 to Gn are deformed, the LRF 15 detects deformation of the grating.

Specifically, when the grating-shaped bumper 10 is deformed by contact with any obstruction, any of the deformed grating members G1 to Gn is displaced relative to the LRF 15 in the distance direction or the angle direction. Hence, reflected light different from the normal state is received. Thus, a contact state is determined. Here, since the grating members G1 to Gn are formed of an elastic material such as synthetic rubber, they are easily deformed by contact. This allows reflected light different from the normal state to be given to the LRF 15.

Figure 5:
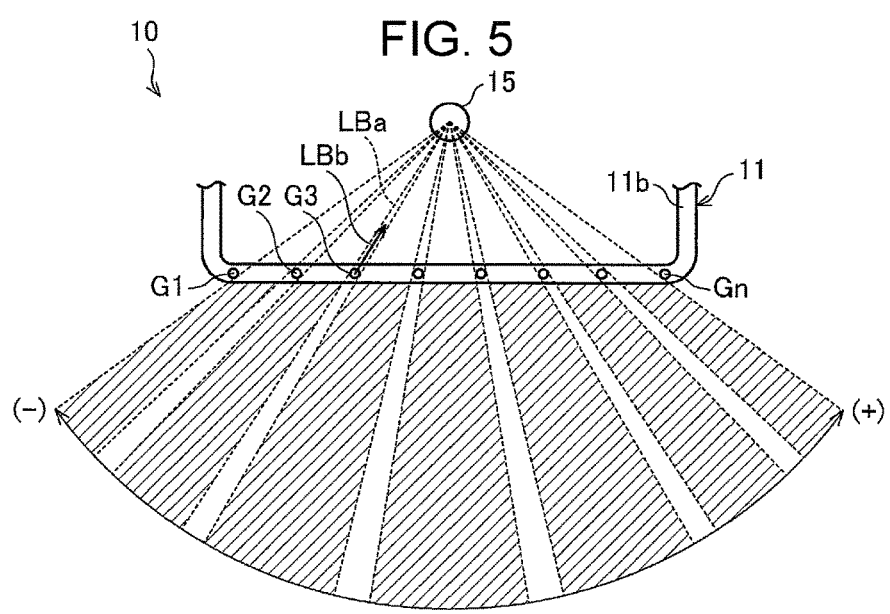
FIG. 5 illustrates a traveling state of light applied from the laser range finder onto grating members of the grating-shaped bumper having a normal shape and a traveling state of reflected light from the grating members.

Here, the angle reference of the LRF 15 will be described with reference to FIG. 5. In the angle reference of the LRF 15, a downward direction and a counterclockwise direction in FIG. 5 are taken as a 0-degree direction and a +-direction, respectively. In a non-contact state, for example, the grating member G1 returns reflected light over the angle region of −60 to −58 degrees, and when it comes into contact with an obstruction, the distance of the reflected light from the region of −60 to −58 degrees shortens (distance direction), or the angle region shifts to a region of −61 to −59 degrees (angle direction).

Figure 2:
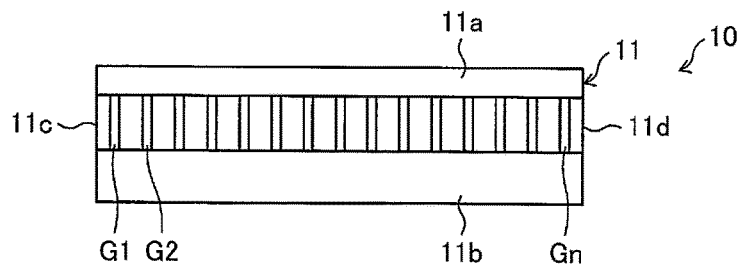
FIG. 2 is a front view illustrating a structure of a grating-shaped bumper provided in the unmanned carrier.

Next, details of the grating-shaped bumper 10 will be described with reference to FIG. 2. FIG. 2 is a front view illustrating the structure of the grating-shaped bumper 10.

The grating-shaped bumper 10 has a frame 11, and the frame 11 includes an upper frame 11a in upper part of the bumper, a lower frame 11b in lower part of the bumper, and side frames 11c and 11d in side parts of the bumper. Between the upper frame 11a and the lower frame 11b, the grating members G1 to Gn are arranged at intervals (equal intervals). The frame 11 and the grating members G1 to Gn are suitably formed of an easily deformable elastic material. However, when the structural strength is required for arrangement, the frame 11 may be formed of, for example, a rather hard elastic material or a soft resin material.

The upper frame 11a and the lower frame 11b are long members that hold end portions of the grating members G1 to Gn arranged in the longitudinal direction thereof. While the side frames 11c and 11d may be provided, the grating members G1 and Gn at both ends may be used as the side frames 11c and 11d, respectively.

While the grating members G1 to Gn may each be formed of either a columnar member or a prismatic member, a columnar member is adopted here, and the diameter is 10 mm. The interval between the grating members G1 to Gn is appropriately set within the range of 20 to 30 mm.

The height of the grating-shaped bumper 10, that is, the distance from an upper end of the upper frame 11a to a lower end of the lower frame 11b is determined from factors such as the use method of the unmanned carrier 100 to which the grating-shaped bumper 10 is applied and the supposed sizes of obstructions, and is 100 mm here.

Figure 3:
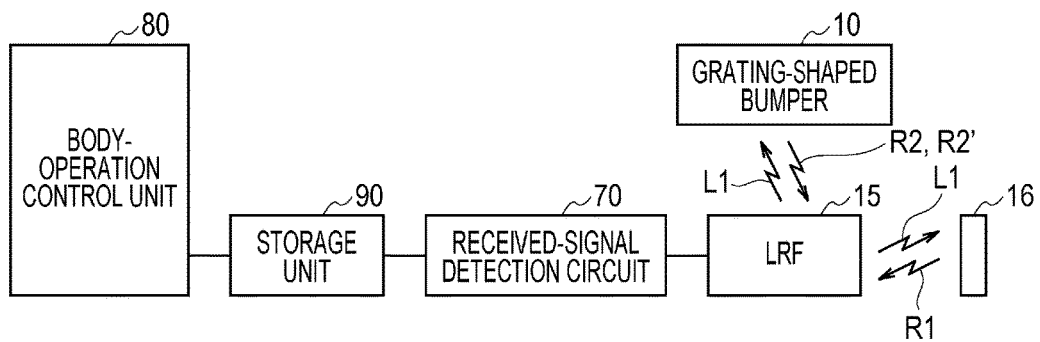
FIG. 3 is a block diagram illustrating a configuration of a control system in the unmanned carrier, which stops the unmanned carrier in response to obstruction existence detection and obstruction contact detection.
Figure 4:
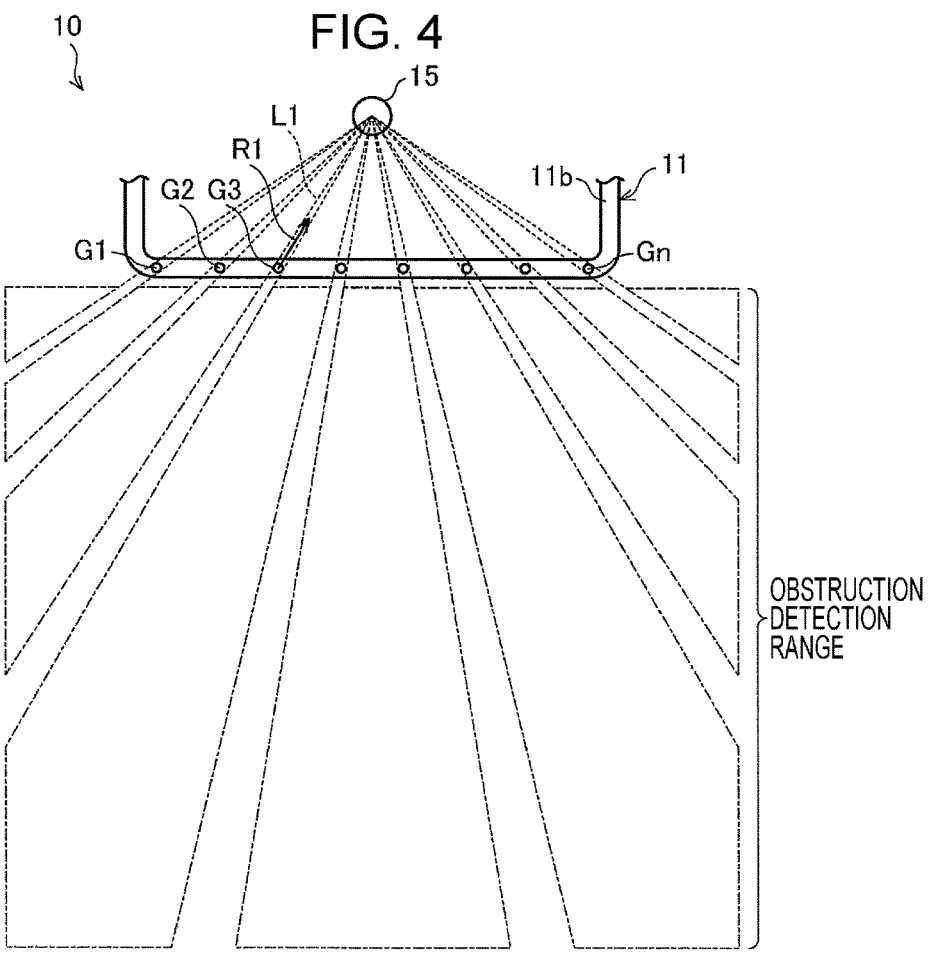
FIG. 4 illustrates an obstruction detection range of a laser range finder provided in the unmanned carrier.

Further, a description will be given of a control system that safely stops the unmanned carrier 100 of this embodiment when the existence of an obstruction is detected, or when the grating-shaped bumper 10 provided in the unmanned carrier 100 is deformed by contact with an obstruction, with reference to FIG. 3. FIG. 3 is a block diagram illustrating the configuration of the control system in the unmanned carrier 100, which stops the unmanned carrier 100 in response to existence detection of an obstruction and contact detection of the obstruction. FIG. 4 illustrates an obstruction detection range of the LRF 15.

The unmanned carrier 100 includes the control system illustrated in FIG. 3. In this control system, in a normal obstruction detecting operation, the LRF 15 detects an obstruction 16 existing ahead of or around the vehicle body by receiving reflected light R1 from the obstruction 16 by laser light L1 oscillated from the LRF 15 and measuring the distance to the obstruction 16. A received-signal detection circuit 70 converts a received signal (detection output) from the LRF 15 into data (distance data), and stores the data in a storage unit 90. The storage unit 90 prestores a predetermined range ahead of and around the vehicle body as an obstruction detection range. As illustrated in FIG. 4, the laser light L1 emitted from the LRF 15 passes between the grating members G1 to Gn except for the reflected light R1 reflected by the grating members G1 to Gn, and spreads outward from the grating-shaped bumper 10. As illustrated in FIG. 4, the obstruction detection range is determined as a range which is within a predetermined region ahead of and around the vehicle body (an area surrounded by one-dot chain line) and into which light can be applied from the LRF 15 without being blocked by the grating members G1 to Gn. Body-operation control unit 80 compares the above reference data stored in the storage unit 90 and the distance data (measured distance) acquired during traveling, in each direction. When distance data corresponding to the inside of the obstruction detection range exists, in a direction in which the light passes through the grating in the reference data to be described later, the body-operation control unit 80 determines that the irradiated object is an obstruction and that the obstruction exists at that position (first detection processing). In this way, the received signal from the LRF 15 corresponding to the reflected light R1 received from the obstruction is fed back to the body-operation control unit 80 via the received-signal detection circuit 70 and the storage unit 90. Thus, the body-operation control unit 80 stops or decelerates the unmanned carrier as necessary.

On the other hand, since the laser light L1 from the LRF 15 is also irradiated to the grating members G1 to Gn, the LRF 15 also receives reflected light R2 from the grating members G1 to Gn. In this case, the grating-shaped bumper 10 is specified as an irradiated object. When the grating-shaped bumper 10 comes into contact with an obstruction, the LRF 15 receives reflected light R2' in a state different from the reflected light R2 in the normal state, for example, owing to deformation of one or some of the grating members G1 to Gn. When a received signal corresponding to the reflected light R2' is output from the LRF 15, the received-signal detection circuit 70 converts the received signal into distance data, and stores the distance data in the storage unit 90. The storage unit 90 prestores the reference data (reference distance), that consists of traveling states of reflected light to be received from the grating members G1 to Gn by the LRF 15 in the normal state of the grating-shaped bumper 10 (a state in which an obstruction or the like is not in contact therewith). The body-operation control unit 80 compares the reference data stored in the storage unit 90 and distance data (measured distance) acquired during traveling, in each direction. When the acquired data includes a direction in which the distance is longer than the reference data (a direction in which the laser light L1 is reflected in a direction different from the direction of the normal state and does not return as the reflected light R2 owing to movement of the grating members G1 to Gn in the angle direction), the body-operation control unit 80 considers that any of the grating members G1 to Gn is deformed by contact, and determines that the grating-shaped bumper 10 came into contact with an obstruction. Alternatively, when the distance from the reflection point to the receiving point of the reflected light R2' is shorter than that of the reflected light R2 in the directions in which the grating members G1 to Gn exist in the reference data, the body-operation control unit 80 also considers that any of the grating members G1 to Gn is deformed by contact, and determines that the grating-shaped bumper 10 came into contact with an obstruction. In this way, the body-operation control unit 80 determines that the grating members G1 to Gn are deformed, that is, that the grating-shaped bumper 10 came into contact with any obstruction (second detection processing). In this way, the received signal from the LRF 15 corresponding to the reflected light R2' received from the grating-shaped bumper 10 is fed back to the body-operation control unit 80 via the received-signal detection circuit 70 and the storage unit 90. Thus, the body-operation control unit 80 stops or decelerates the unmanned carrier 100 as necessary.

From the reflected light R1 from the obstruction or the like, it is thus possible to determine whether or not the obstruction to be detected is an obstruction approaching from the front or the surroundings of the vehicle body, and to detect the distance to the obstruction. Also from the reflected light R2' from the grating-shaped bumper 10 (grating members G1 to Gn), it is possible to determine that the grating-shaped bumper 10 came into contact with any obstruction.

Figure 18:
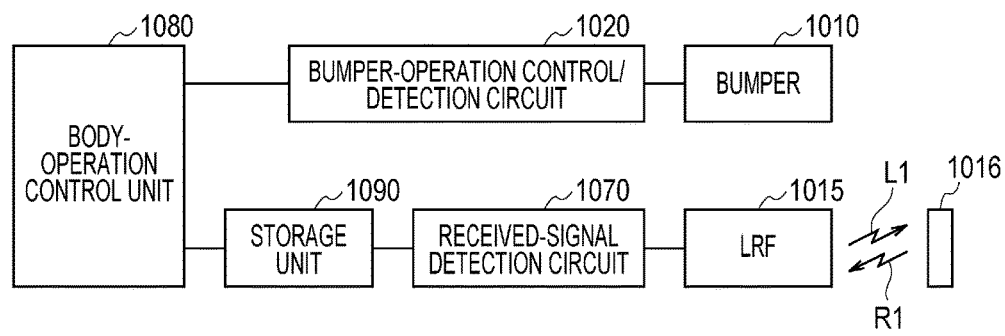
FIG. 18 is a block diagram illustrating a configuration of a conventional control system that stops an AGV in response to obstruction existence detection and obstruction contact detection.

To perform these processing operations (first detection processing and second detection processing), in the above-described control system, a feedback system for contact detection of the obstruction with the grating-shaped bumper 10 (a processing system composed of the received-signal detection circuit 70, the body-operation control unit 80, and the storage unit 90) and a feedback system for existence detection of the obstruction can be commonalized. Thus, compared with the conventional control system illustrated in FIG. 18, the bumper-operation control/detection circuit 1020 and the body-operation control unit 1080, and the connecting unit for connecting these can be omitted.

The above-described control system is also applied to the following second to fifth embodiments.

Figure 6:
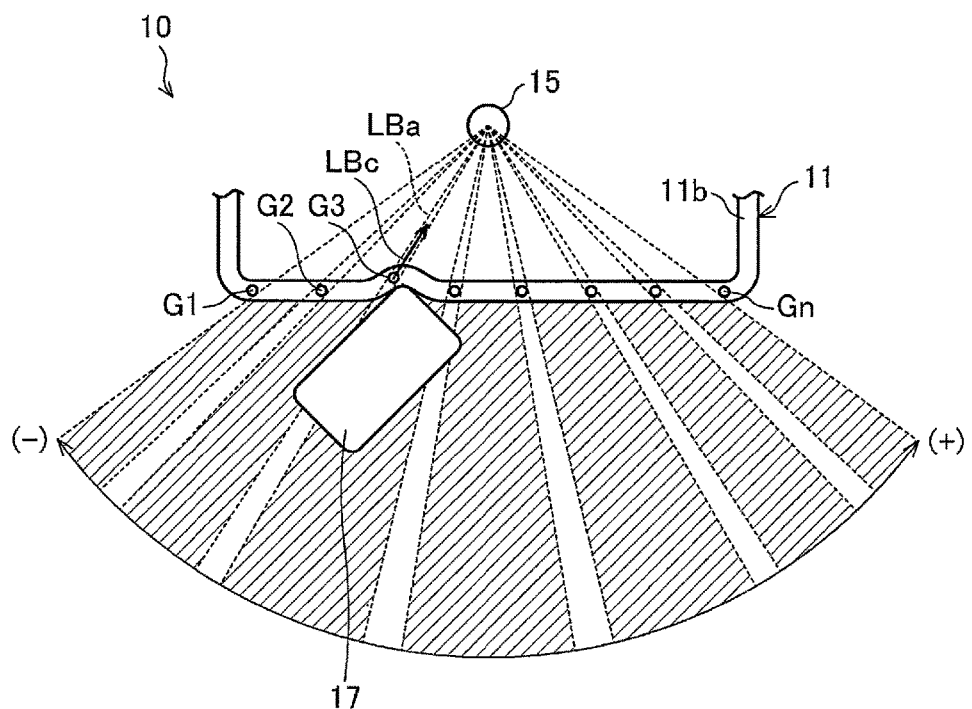
FIG. 6 illustrates a traveling state of light applied from the laser range finder onto the grating members of the grating-shaped bumper deformed by contact with an obstruction and a traveling state of reflected light from the grating members.

Next, a method for detecting deformation state of the grating-shaped bumper 10 based on the unmanned carrier 100 will be described with reference to FIGS. 5 and 6. FIG. 5 illustrates the traveling state of light applied from the LRF 15 onto the grating members G1 to Gn in the grating-shaped bumper 10 at normal shape and the traveling state of reflected light from the grating members G1 to Gn. FIG. 6 illustrates the traveling state of light applied from the LRF 15 to the grating members G1 to Gn in the grating-shaped bumper 10 that is deformed by contact of an obstruction therewith and the traveling state of reflected light from the grating members G1 to Gn.

FIGS. 5 and 6 illustrate a state of the lower frame 11b and the grating members G1 to Gn in the grating-shaped bumper 10, as viewed from the upper side, and the upper frame 11a is omitted for convenience. In FIGS. 5 and 6, the upper side of the lower frame 11b corresponds to the inner side of the unmanned carrier 100, and the lower side of the lower frame 11b corresponds to the outer side (forward side) of the unmanned carrier 100. The LRF 15 oscillates laser light on the inner side and scans the laser light in the counterclockwise direction (+-direction) or the opposite direction (--direction) in the figures.

The beam diameter of the laser light from the LRF 15 is about 10 mm at a position 1 m ahead of the LRF 15. For this reason, the beam diameter of the laser light passing through the spaces between the grating members G1 to Gn in the grating-shaped bumper 10 is about 3 to 5 mm. The LRF 15 detects the presence or absence of obstruction ahead of the unmanned carrier 100 by emitting such laser light and receiving reflected light of the scanned light.

The laser light passing through the spaces between the grating members G1 to Gn is applied to diagonally shaded areas, and is continuously emitted in pulses to an extent such that the optical axes thereof are adjacent to one another so as to be used for length measurement (distance measurement). In regard to the laser light applied to the grating members G1 to Gn, the reflection distances of reflected light in the normal state of FIG. 5 from the reflection points (grating members G1 to Gn) to the light receiving point (light receiving element of the LRF 15) are known. The reflection distances for the reflection points at the grating members G1 to Gn are stored as reference distances in the storage unit 90 in the form of array data consisting of the direction and distance as a unit.

As illustrated in FIG. 5, for example, when reflected light LBa from the grating member G3, of the laser light applied to the grating member G3, is received by the LRF 15, the body-operation control unit 80 determines, by reference to the above-described reflection distances, that reflected light LBb in a known reflection state (reflection position) is received, and does not detect contact of an obstruction.

In contrast, as illustrated in FIG. 6, when the grating member G3 is deformed by contact of the grating-shaped bumper 10 with an obstruction 17 that is at a position lower than the light application area of the LRF 15 (or, for example, hanging from the ceiling), laser light is not directly reflected from the obstruction 17. However, laser light LBa applied to the grating member G3 is reflected as reflected light LBc whose reflection state is changed by deformation of the grating member G3. Therefore, the LRF 15 does not receive the reflected light LBb in the known reflection state, but receives the reflected light LBc in the reflection state different from the normal reflection state. Thus, the body-operation control unit 80 determines, by reference to the above-described reflection distances, that the reflected light LBc in a different reflection state from the known reflected light LBb is received, and detects deformation of the grating-shaped bumper 10, which is the contact of the obstruction. In this case, the body-operation control unit 80 stops the unmanned carrier 100 by giving instructions to an unillustrated control/driving circuit.

While FIG. 6 illustrates the state in which laser light passing through the grating-shaped bumper 10 and applied outside is not blocked by the obstruction 17, the obstruction 17 is not diagonally shaded, for convenience of clear illustration of the obstruction 17.

While the grating members G1 to Gn are disposed along the vertical direction as illustrated in FIG. 2, they are not limited thereto. The shape of the bumper is required to transmit most of emitted light from the LRF 15 and block a part thereof in the scan region of the LRF 15, and to change the position of the blocked area by contact of the obstruction with the bumper. That is, the position where the laser light from the LRF 15 is blocked when the bumper is not deformed is known. The opening may have any shape as long as the position is displaced when the bumper is deformed.

Next, other specific examples of the bumper will be described. FIGS. 7(a) to 7(f) are front views illustrating structures of bumpers 10A to 10F, respectively, used in the unmanned carrier 100 other than the grating-shaped bumper 10.

Figure 7:
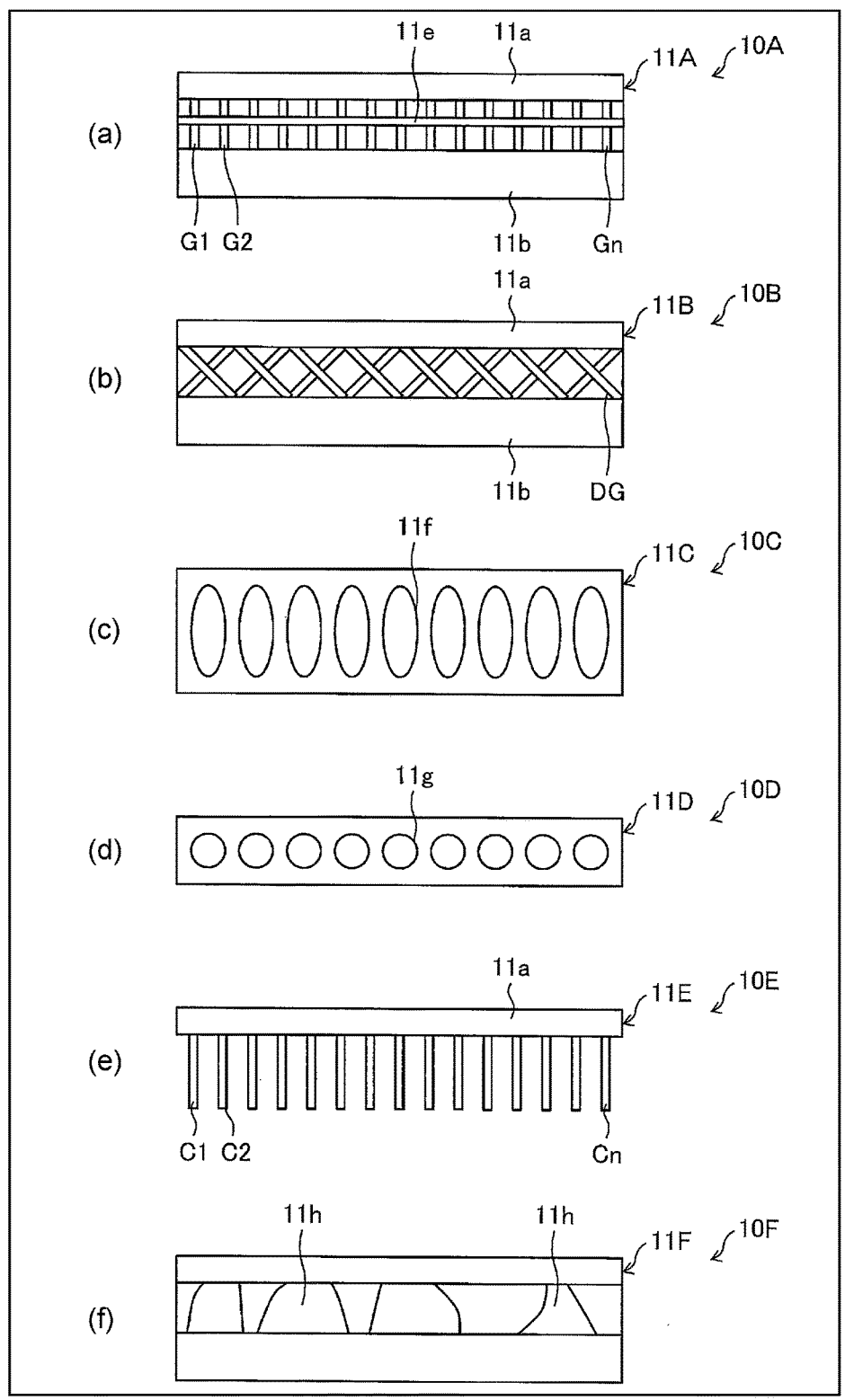
FIGS. 7(a) to 7(f) are front views illustrating structures of other bumpers used in the unmanned carrier.

A bumper 10A illustrated in FIG. 7(a) includes an upper frame 11a, a lower frame 11b, and grating members G1 to Gn, similarly to the grating-shaped bumper 10, and further includes a connecting member 11e. The connecting member 11e is a rod-shaped member, is disposed parallel to the longitudinal direction of the upper frame 11a and the lower frame 11b, and is connected to the grating members G1 to Gn. A bumper 10B illustrated in FIG. 7(b) includes an upper frame 11a and a lower frame 11b, similarly to the grating-shaped bumper 10, and further includes a diagonal grating DG having a diagonal pattern. A bumper 10C illustrated in FIG. 7(c) includes a frame 11C in which a plurality of elliptic holes 11f, which are long in the vertical direction, are arranged in the horizontal direction. A bumper 10D illustrated in FIG. 7(d) includes a frame 11D in which a plurality of circular holes 11g are arranged in the horizontal direction. A bumper 10E illustrated in FIG. 7(e) includes an upper frame 11a, similarly to the grating-shaped bumper 10, and further includes a plurality of comb tooth members C1 to Cn arranged at intervals to extend downward from the upper frame 11a. A bumper 10F illustrated in FIG. 7(f) includes a frame 11F in which a plurality of openings 11h having irregular shapes are provided.

Figure 8:
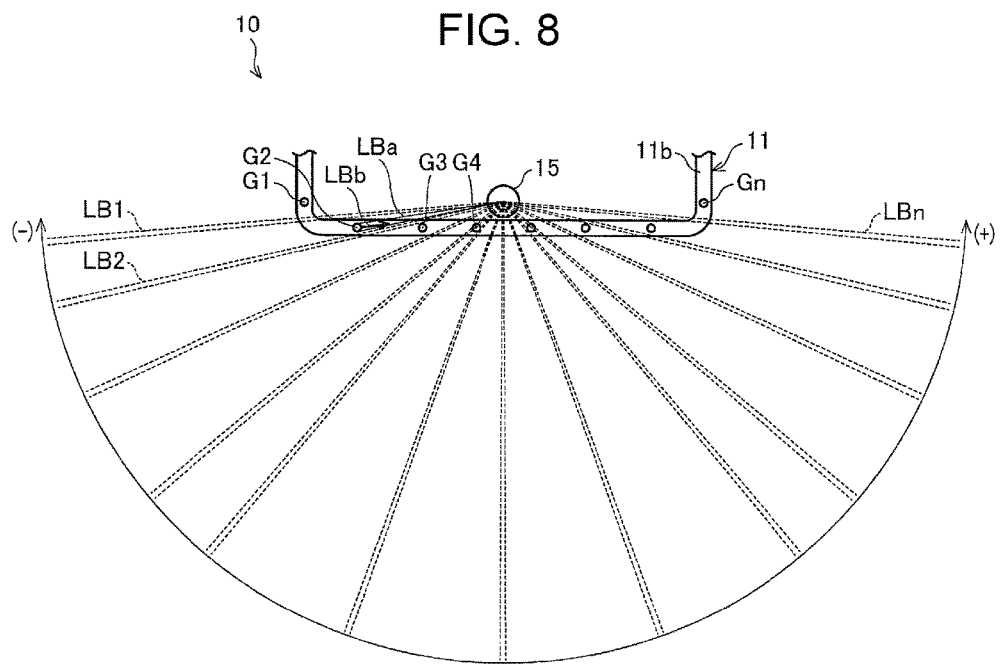
FIG. 8 illustrates a traveling state of light applied from the laser range finder onto the grating members of the grating-shaped bumper having a normal shape in an unmanned carrier according to a modification of the first embodiment and a traveling state of reflected light from the grating members.

Next, a modification of this embodiment will be described with reference to FIG. 8. FIG. 8 illustrates the traveling state of light applied from an LRF 15 to grating members G1 to Gn in a grating-shaped bumper 10 of a normal shape in an unmanned carrier 100 according to a modification of the first embodiment and the traveling state of reflected light from the grating members G1 to Gn.

The LRF 15 is generally set in an outer part of the unmanned carrier 100 to widen the field of view. However, even when the LRF 15 cannot help but be set inside the footprint of the unmanned carrier 100 for some reason, it is generally set at a position as close to the front of the unmanned carrier 100 as possible to widen the scan region (field of view). In such a case, if there is no room in the setting space of the LRF 15 inside the unmanned carrier 100, the LRF 15 is set close to a rear surface of the grating-shaped bumper 10, as illustrated in FIG. 8.

In such a case, the interval of the grating members G1 to Gn is set to increase with increasing distance from the LRF 15 and approaching toward both front corner portions of the unmanned carrier 100 so that laser lights LB1 to LBn are effectively applied to a forward obstruction even at the front corner portions of the unmanned carrier 100. Specifically, the interval of the grating members G1 to Gn is such that the interval between the grating members G2 and G3 is wider than the interval between the grating members G3 and G4.

Second Embodiment

A second embodiment of the present invention will be described as follows with reference to FIGS. 9 and 10. For convenience of explanation, members having the same functions as those of the members of the above-described first embodiment are denoted by the same reference numerals, and descriptions thereof are skipped.

Figure 9:
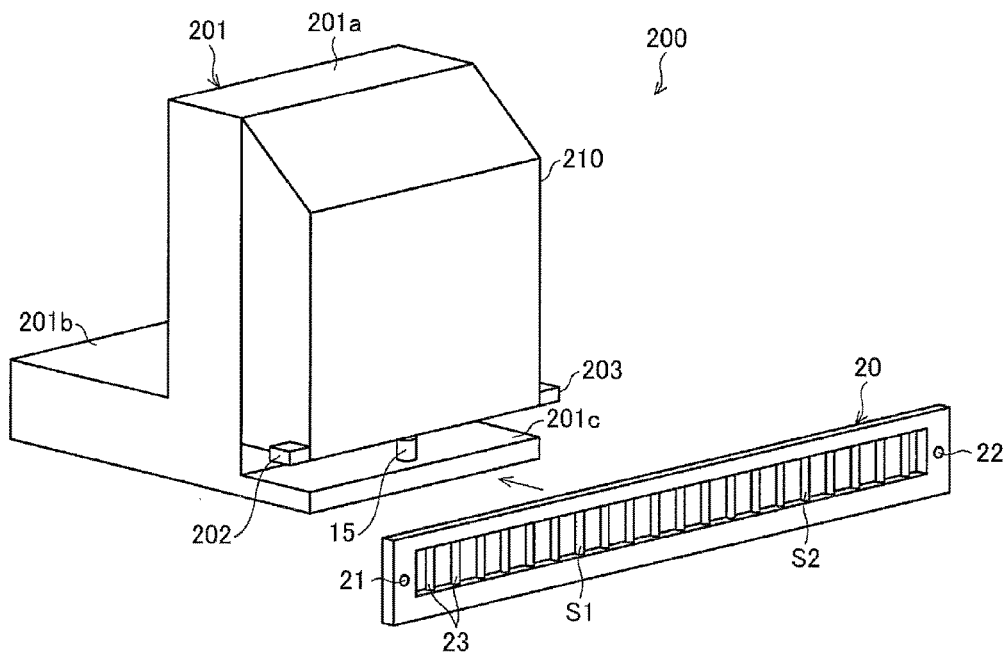
FIG. 9 is a perspective view illustrating an attachment method for a grating-shaped bumper in an unmanned carrier according to a second embodiment of the present invention.

FIG. 9 is a perspective view illustrating an attachment method for a grating-shaped bumper 20 to an unmanned carrier 200 according to the second embodiment of the present invention. FIG. 10 is a top view of the unmanned carrier 200 to which the grating-shaped bumper 20 is attached.

As illustrated in FIG. 9, the unmanned carrier 200 (mobile body) includes a body part 201, a front part 210, and a grating-shaped bumper 20. The body part 201 includes an upright portion 201a standing upright, a mounting table 201b extending rearward from a lower end portion of the upright portion 201a, and a bottom plate portion 201c extending frontward from the lower end portion of the upright portion 201a. A lower surface of the body part 201 is provided with unillustrated wheels. The unmanned carrier 200 can be moved by driving the wheels. The front part 210 is attached to a front surface of the upright portion 201a, and is disposed so that a lower end surface thereof is at a predetermined distance from the bottom plate portion 201c. Thus, a space is formed between the lower end surface of the front part 210 and the bottom plate portion 201c in the front lower part of the unmanned carrier 200. By utilizing this space, an LRF 15 is disposed near the front end of the bottom plate portion 201c on the upper surface of the bottom plate portion 201c. This space also ensures a wide region (scan region) in which laser light is emitted from the LRF 15.

At lower end portions of both side surfaces of the front part 210 and near two front corner portions, projecting portions 202 and 203 for attachment of the grating-shaped bumper 20 are provided. Specifically, the projecting portions 202 and 203 are fixed to the front part 210 by screws or the like. To have elasticity, these projecting portions 202 and 203 are preferably formed of synthetic rubber that is a material similar to the material of the grating-shaped bumper 20.

The grating-shaped bumper 20 (bumper) is a structural member shaped like a long frame, and is formed of an elastic material, such as synthetic rubber, to have elasticity as a whole. At opposite ends of the grating-shaped bumper 20, fastening holes 21 and 22 are provided. In an opening of the grating-shaped bumper 20, a plurality of grating members 23 are arranged at intervals, similarly to the grating members G1 to Gn provided in the grating-shaped bumper 10 of the unmanned carrier 100 in the first embodiment.

Since a space is formed between each two adjacent grating members 23, the projecting portions 202 and 203 are fitted in upper sides of predetermined spaces S1 and S2, respectively, of these spaces. Since the projecting portions 202 and 203 have elasticity, the grating-shaped bumper 20 can be easily attached to the front part 210. Further, since the projecting portions 202 and 203 are fitted in the upper sides of the spaces S1 and S2, laser light scanned by the LRF 15 is not blocked.

Figure 10:
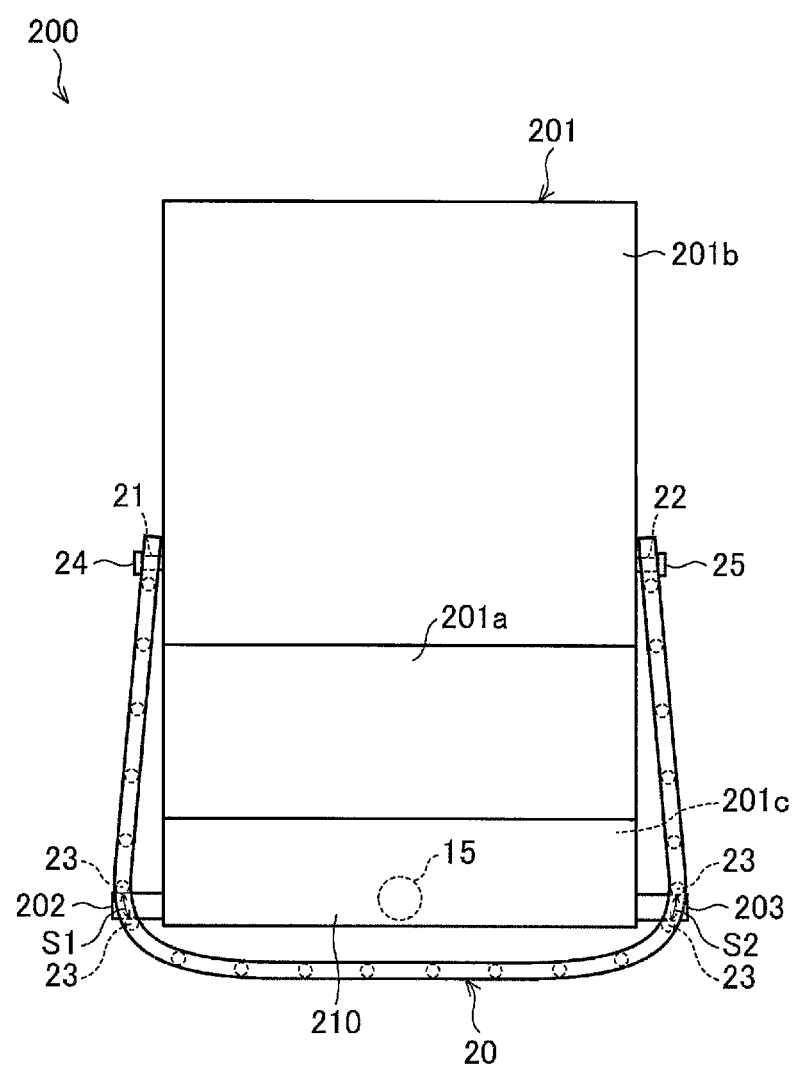
FIG. 10 is a top view of the unmanned carrier to which the grating-shaped bumper illustrated in FIG. 9 is attached.

As illustrated in FIG. 10, the opposite end portions of the grating-shaped bumper 20 are fixed to the body part 201 by passing fasteners 24 and 25, such as screws, through the fastening holes 21 and 22, respectively, in a state in which the end portions are bent to extend along opposite side surface portions (left and right) of the unmanned carrier 200. Thus, the grating-shaped bumper 20 is attached to the front portion and the side surface portions of the unmanned carrier 200. Portions of the grating-shaped bumper 20 between the fastening hole 21 and the space S1, between the spaces S1 and S2, and between the space S2 and the fastening hole 22 bulge and overhang somewhat from the surface of the body part 201.

To widen the scan region (field of view), the LRF 15 is generally set in an outer part of the unmanned carrier 200. In contrast, this embodiment adopts a simple attachment structure in which the grating-shaped bumper 20 is fixed at both end portions to the body part 201 and at the middle portions in the spaces S1 and S2 to the front part 210 to detect deformation of the grating-shaped bumper 20 in a region out of the scan region, as illustrated in FIG. 10. Thus, even when an obstruction comes into contact with the region of the grating-shaped bumper 20 out of the scan region, deformation due to the contact also appears on the front side of the grating-shaped bumper 20.

Thus, when the obstruction comes into contact with the grating-shaped bumper 20, deformation due to impact of the contact is easily transmitted to the entire grating-shaped bumper 20 by elastic force of the rubber material. Further, since the projecting portions 202 and 203 are also formed of synthetic rubber, in the case of contact with the side surface portion of the unmanned carrier 200, deformation of the grating-shaped bumper 20 is transmitted to the front side. Since such effect increases the number of data for the LRF 15 to detect disturbance of reflected light, it is easy to determine whether to stop the operation of the unmanned carrier 200.

While the material that forms the grating-shaped bumper 20 is synthetic rubber, as described above, the synthetic rubber is appropriately selected from, for example, styrene-butadiene rubber (SBR), nitrile rubber (NBR), chloroprene rubber (CR), ethylene propylene rubber (EPT), butyl rubber (IIR), silicone rubber (Q), fluororubber (FKM), and urethane rubber (U). These materials that form the bumper are similarly applied to the other embodiments.

Third Embodiment

A third embodiment of the present invention will be described as follows with reference to FIGS. 11 and 12. In this embodiment, a grating-shaped bumper is more effectively utilized.

For convenience of explanation, members having the same functions as those of the members in the above-described first and second embodiments are denoted by the same reference numerals, and descriptions thereof are skipped.

Figure 11:
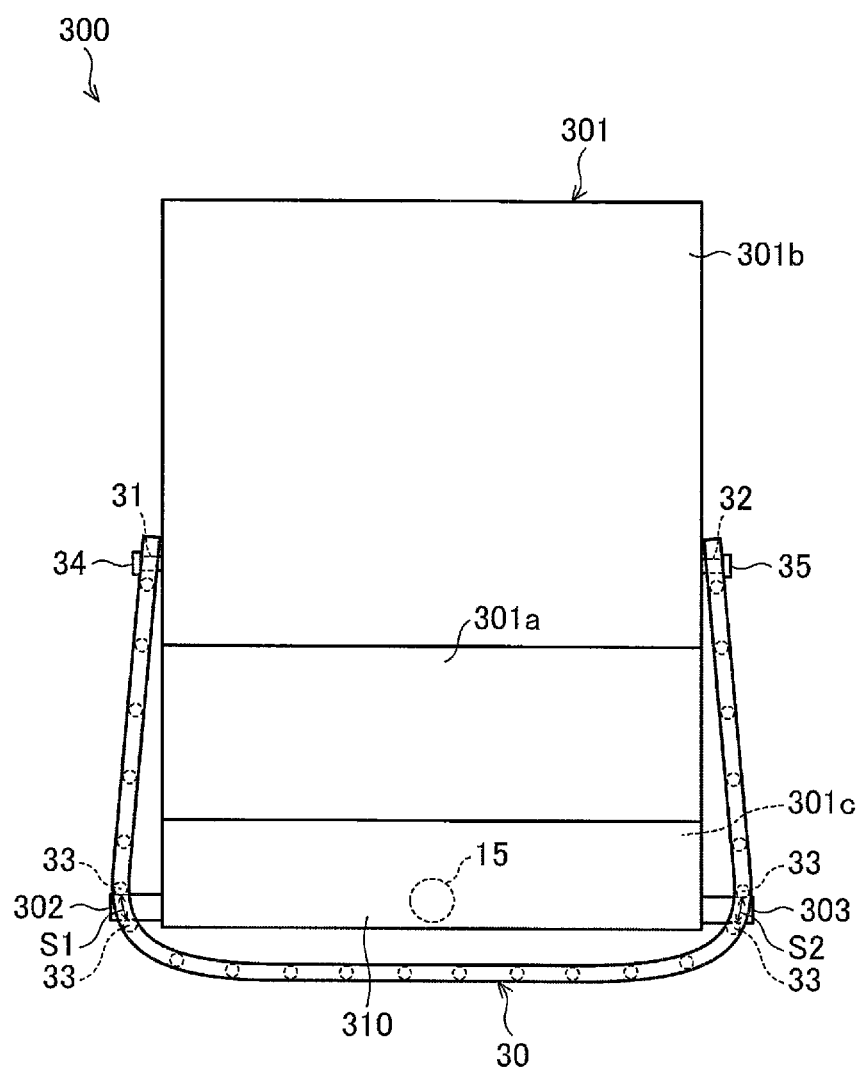
FIG. 11 is a top view illustrating a structure of an unmanned carrier according to a third embodiment of the present invention.

FIG. 11 is a top view of an unmanned carrier 300 according to this embodiment. FIG. 12 is a top view of another unmanned carrier 400 according to this embodiment.

As illustrated in FIG. 11, the unmanned carrier 300 (mobile body) has a structure similar to that of the unmanned carrier 200, and includes a body part 301, a front part 310, and a grating-shaped bumper 30. The body part 301 includes an upright portion 301a, a mounting table 301b, and a bottom plate portion 301c. In contrast, as illustrated in FIG. 12, the unmanned carrier 400 (mobile body) has a structure similar to that of the unmanned carrier 200, and includes a body part 401, a front part 410, and a grating-shaped bumper 40. The body part 401 includes an upright portion 401a, a mounting table 401b, and a bottom plate portion 401c.

The unmanned carrier 300 has a width larger than that of the unmanned carrier 200, and the unmanned carrier 400 has a width smaller than that of the unmanned carrier 200.

In general, AGVs, such as an unmanned carrier, are rarely standardized, but are often custom-specified according to the factory or product. Hence, the AGVs are different in size such as width. If the special bumper described in PTL 2 is applied to such a case, the unmanned carriers 300 and 400 need their respective bumpers corresponding to the widths thereof, and this causes problems of, for example, the increase in cost and parts management.

In contrast, the grating-shaped bumpers 30 and 40 (bumpers) applied to the unmanned carriers 300 and 400 of this embodiment, respectively, can each be produced as a grating-shaped bumper in which a grating structure is arranged in the longitudinal direction, similarly to the grating-shaped bumper 10 of FIG. 2 or the grating-shaped bumper 20 of FIG. 9. When these grating-shaped bumpers 30 and 40 are wound, for example, in a roll and are cut to suitable lengths to be used for the unmanned carriers 300 and 400 having different widths, the necessity of obtaining an exclusive bumper or a customized bumper is eliminated, and this can achieve, for example, cost reduction and simplification of parts management.

In the unmanned carrier 300 illustrated in FIG. 11, projecting portions 302 and 303 for attachment of the grating-shaped bumper 30 are provided near two front corner portions in lower end portions of opposite side surfaces of the front part 310 in the unmanned carrier 300. Spaces S1 and S2 in which the projecting portions 302 and 303 are to be fitted, respectively, are provided between grating members 33 of the grating-shaped bumper 30. Fastening holes 31 and 32 are provided in opposite end portions of the grating-shaped bumper 30.

Figure 12:
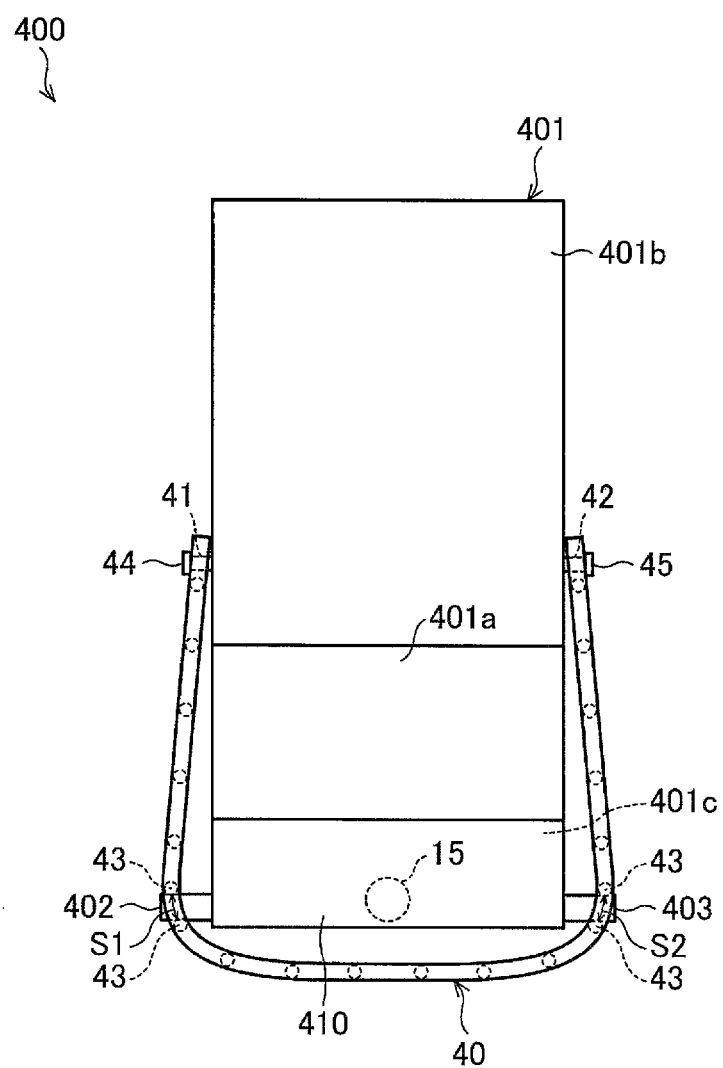
FIG. 12 is a top view illustrating a structure of another unmanned carrier according to the third embodiment of the present invention.

In contrast, in the unmanned carrier 400 illustrated in FIG. 12, projecting portions 402 and 403 for attachment of the grating-shaped bumper 40 are provided near two front corner portions in lower end portions of opposite side surfaces of the front part 410 in the unmanned carrier 400. Further, spaces S1 and S2 in which the projecting portions 402 and 403 are to be fitted, respectively, are provided between grating members 43 of the grating-shaped bumper 40. Still further, fastening holes 41 and 42 are provided in opposite end portions of the grating-shaped bumper 40.

The grating-shaped bumper 30 is attached as follows in a method similar to the attachment method for the grating-shaped bumper 20. First, the grating-shaped bumper 30 is attached to the front part 310 by fitting the projecting portions 302 and 303 in the predetermined spaces S1 and S2 provided between the grating members 33 of the grating-shaped bumper 30, respectively, and the opposite end portions of the grating-shaped bumper 30 are bent to extend along the left and right sides of the unmanned carrier 300. Then, the opposite end portions of the grating-shaped bumper 30 are fixed to the corresponding side surfaces (left and right) of the unmanned carrier 300 by passing the fasteners 34 and 35 through the fastening holes 31 and 32, respectively. The attachment method for the grating-shaped bumper 40 is also similar to the above-described attachment method.

Portions of the grating-shaped bumper 30 of the unmanned carrier 300 between the fastening holes 31 and 32 and the projecting portions 302 and 303, and between the spaces S1 and S2 bulge and overhang somewhat from a surface of the body part 301. This also applies to the grating-shaped bumper 40 of the unmanned carrier 400, and portions between the fastening holes 41 and 42, between the projecting portions 402 and 403 and between the spaces S1 and S2 bulge and overhang somewhat from a surface of the body part 401.

To widen the field of view, the LRF 15 is generally set in an outer part of each of the unmanned carriers 300 and 400. Similarly to the unmanned carrier 200, this embodiment adopts a simple attachment structure in which the grating-shaped bumpers 30 and 40 are fixed at the opposite ends to the body parts 301 and 401 and are fixed at the spaces S1 and S2 in the middle to the front parts 310 and 410, respectively. Thus, even when an obstruction comes into contact with areas of the grating-shaped bumpers 30 and 40 out of the scan region, deformation due to the contact also appears on the front sides of the grating-shaped bumpers 30 and 40.

Thus, when the obstruction comes into contact with the grating-shaped bumpers 30 and 40, deformation due to impact of the contact is easily transmitted to the entire grating-shaped bumpers 30 and 40 by elastic force of the rubber material. Therefore, since the number of data for the LRF 15 to detect disturbance of reflected light is increased, it is easy to determine whether to stop the operations of the unmanned carriers 300 and 400.

Fourth Embodiment

A fourth embodiment of the present invention will be described as follows with reference to FIG. 13. For convenience of explanation, members having the same functions as those in the above-described first embodiment are denoted by the same reference numerals, and descriptions thereof are skipped.

Figure 13:
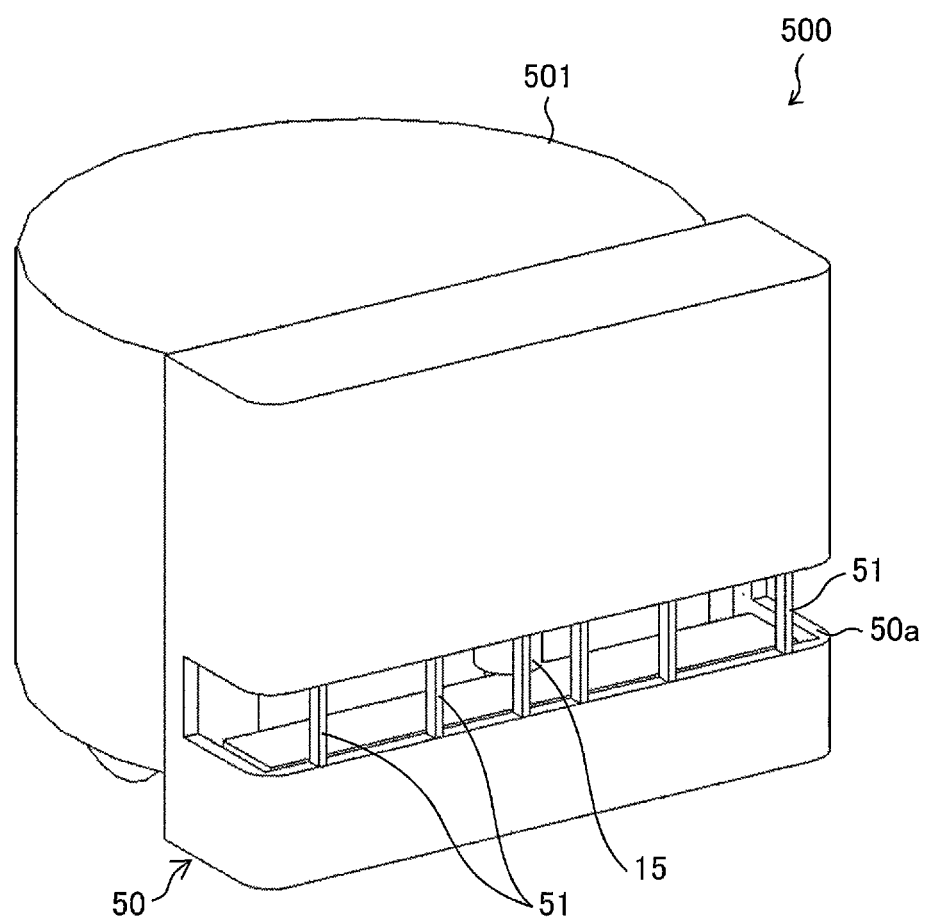
FIG. 13 is a perspective view illustrating a structure of a robot according to a fourth embodiment of the present invention, as viewed from a front part side.

FIG. 13 is a perspective view illustrating a structure of a robot 500 according to the fourth embodiment of the present invention, as viewed from a front part side. In this embodiment, a bumper 50 is assembled in a cleaning robot.

As illustrated in FIG. 13, the robot 500 (mobile body) is a cleaning robot that performs suction cleaning of the floor surface. The bumper 50 is attached to a front side of a body part 501 of the robot 500, and an LRF 15 is disposed on an inner side of the bumper 50. The bumper 50 is a resin component having elasticity, and is connected to the body part 501 with a flexible member being disposed therebetween. A portion of the bumper 50 at a horizontal height where the LRF 15 scans light is cut out to form an opening 50a, where a plurality of grating members 51 are arranged at intervals to form a grating structure. An unillustrated cleaning mechanism is mounted at a position of the body part 501 in the robot 500 on an inner side of the bumper 50 and below the LRF 15. A controller formed by a computer is mounted in the body part 501, and the robot 500 cleans the floor surface while autonomously traveling according to the distances to walls, furniture, and so on that are detected by the LRF 15.

When a low obstruction or a high obstruction out of the optical axis of the LRF 15 comes into contact with the bumper 50, the bumper 50 is displaced relative to the body part 501. The robot 500 detects this displacement on the basis of a change in detection output from the LRF 15, and detects the contact of the obstruction. When the robot 500 detects the contact, it performs retreating and turning operations in combination, and moves in a direction to come out of contact with the obstruction. When the bumper 50 separates from the obstruction, the shape of the bumper 50 returns to its normal position relative to the body part 501, and the robot 500 determines that the contact is removed, and restarts normal traveling.

The self-traveling and the contact releasing operation from the obstruction that are described above are performed by a control system composed of the LRF 15 and the controller mounted in the body part 501. This control system is configured by the control system of the first embodiment illustrated in FIG. 3.

Here, the robot 500 is about 400 mm in left-right width, about 400 mm in front-rear length, and about 300 mm in height. In the height direction, the detection range of the LRF 15 corresponds to only a part of the total height of the robot 500. Contact detection of the robot 500 can be reliably performed by detecting displacement of the bumper 50 with the LRF 15.

Fifth Embodiment

A fifth embodiment of the present invention will be described as follows with reference to FIGS. 14 to 17. In this embodiment, a further example of the setting positions of a grating-shaped bumper 60 and an LRF 15 will be described.

For convenience of explanation, members having the same functions as the members in the above-described first to third embodiments are denoted by the same reference numerals, and descriptions thereof are skipped.

Figure 14:
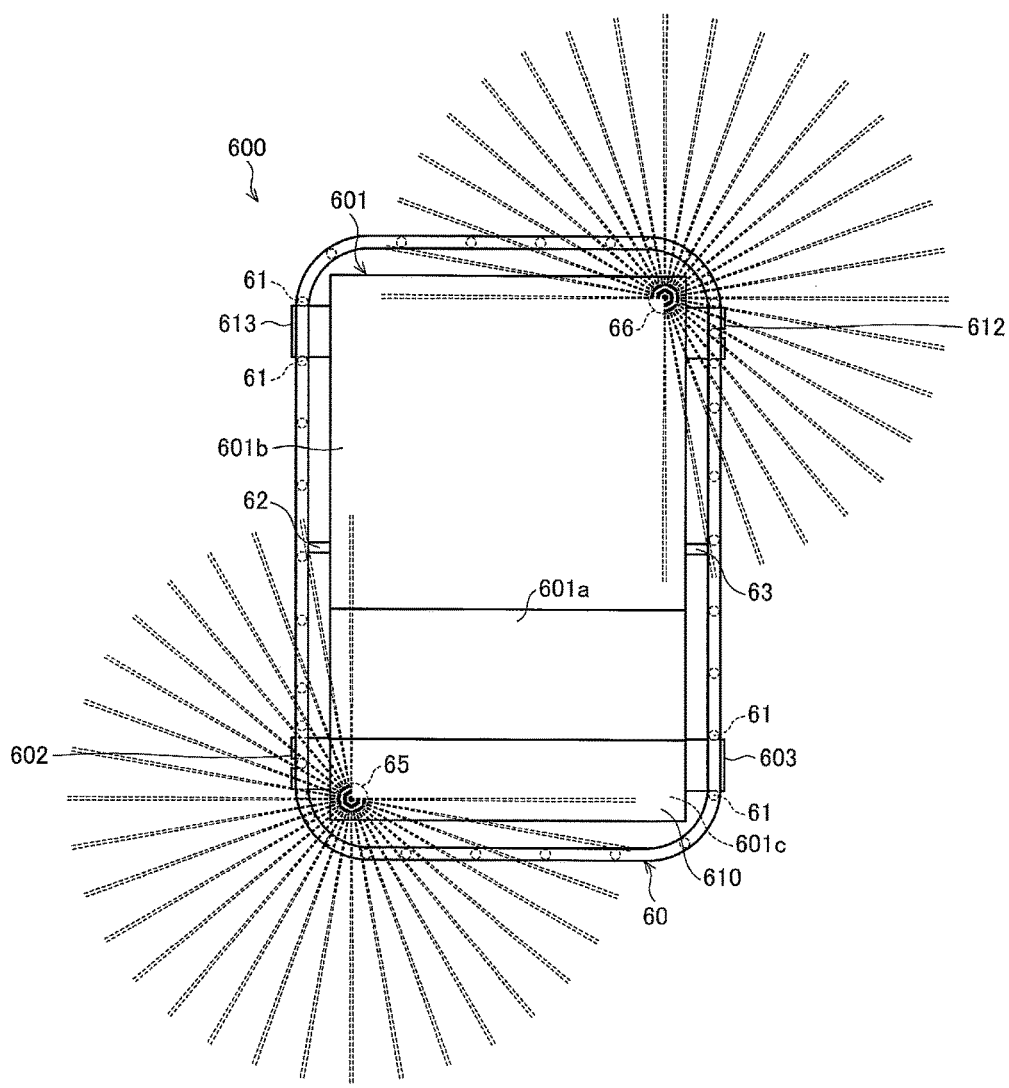
FIG. 14 is a top view illustrating a structure of an unmanned carrier according to a fifth embodiment of the present invention and a fourth embodiment of the present invention and light irradiation ranges of laser range finders.
Figure 15:
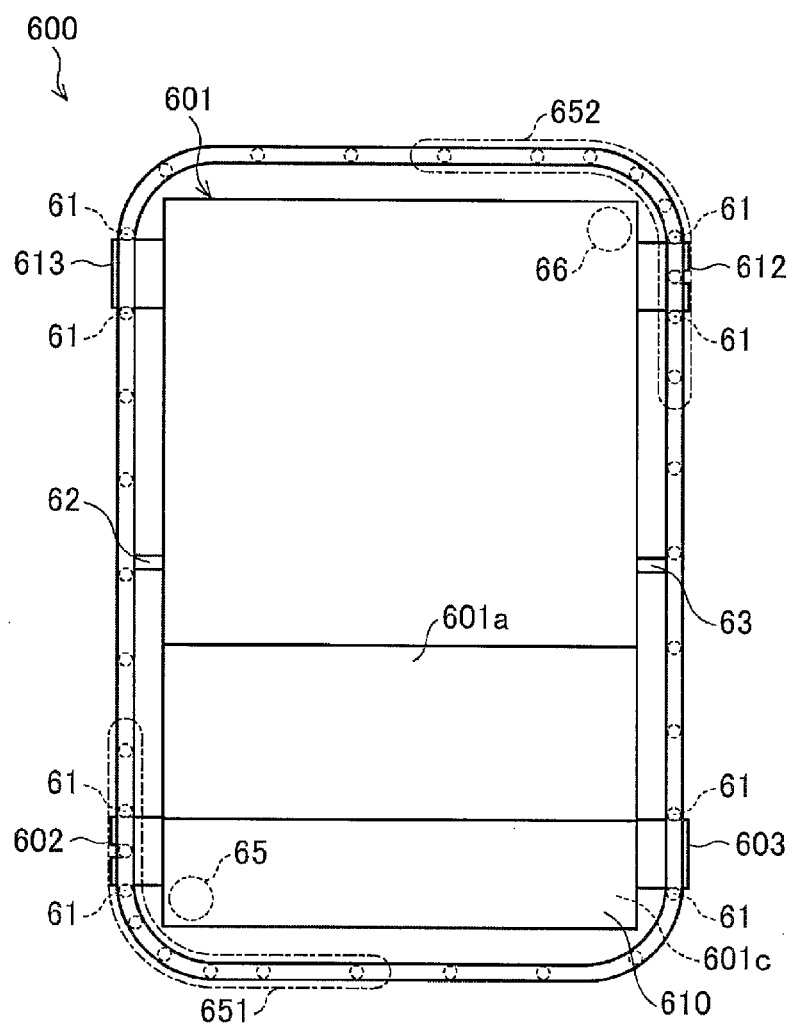
FIG. 15 is a top view illustrating the structure of the unmanned carrier according to the fifth embodiment of the present invention.
Figure 16:
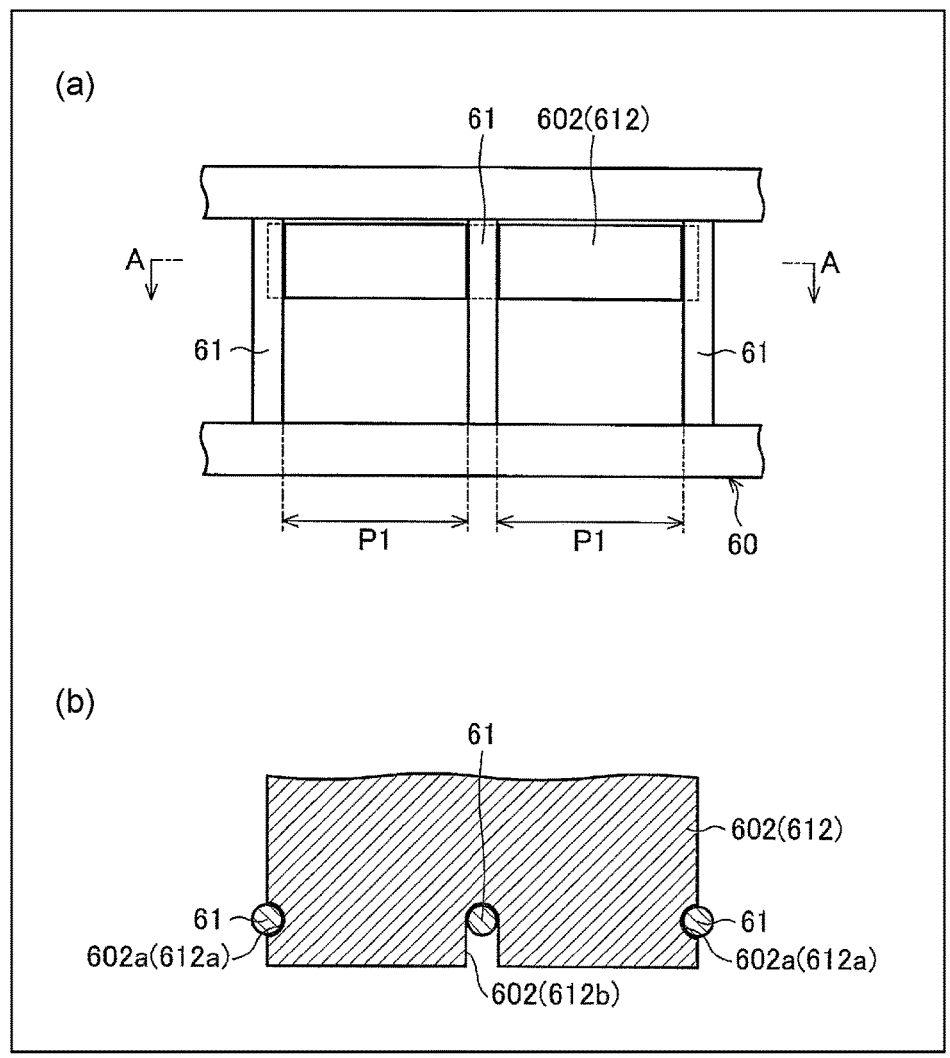
FIG. 16(a) is a front view illustrating the arrangement relationship between a projecting portion and grating members in the unmanned carrier illustrated in FIG. 14.
FIG. 16(b) is a cross-sectional view taken along line A-A of FIG. 16(a).
Figure 17:
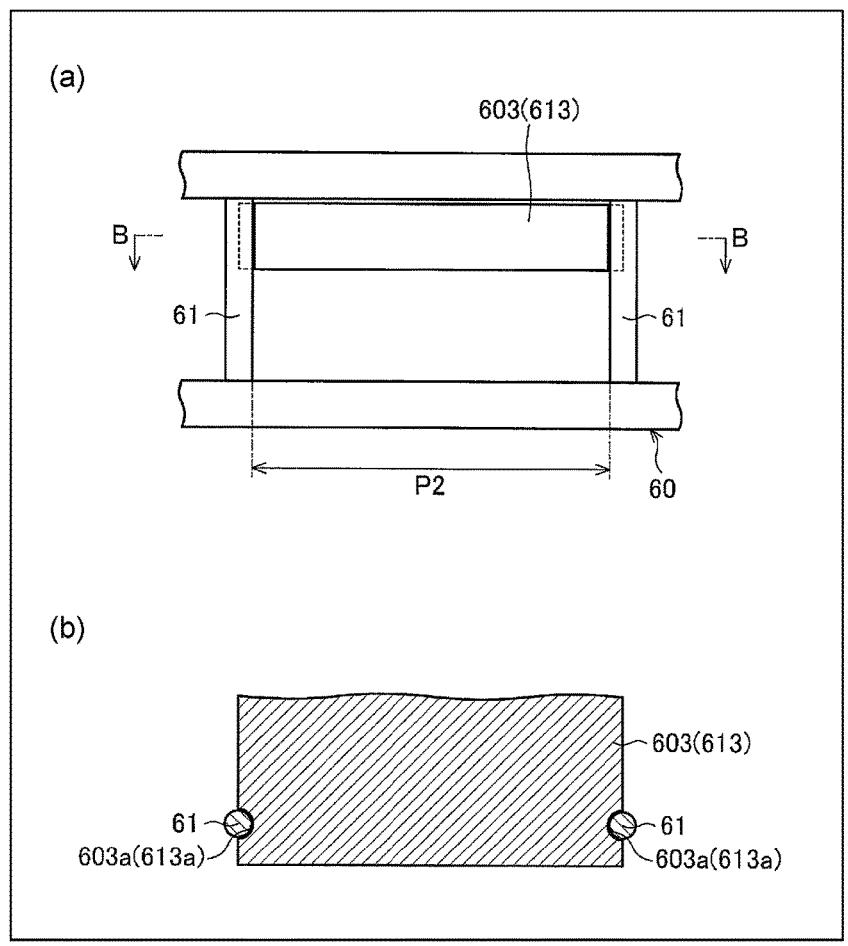
FIG. 17(a) is a front view illustrating the arrangement relationship between another projecting portion and the grating members in the unmanned carrier illustrated in FIG. 14.
FIG. 17(b) is a cross-sectional view taken along line B-B of FIG. 17(a).

FIG. 14 is a top view illustrating a structure of an unmanned carrier 600 and light irradiation ranges of LRFs 65 and 66 according to the fifth embodiment of the present invention. FIG. 15 is a top view illustrating the structure of the unmanned carrier 600 according to the fifth embodiment of the present invention.

As illustrated in FIG. 14, the unmanned carrier 600 (mobile body) includes a body part 601, a front part 610, a grating-shaped bumper 60, and LRFs 65 and 66. The body part 601 has a structure similar to that of the body part 601 in the above-described unmanned carrier 200, and includes an upright portion 601a, a mounting table 601b, and a bottom plate portion 601c. However, unlike the grating-shaped bumper 20, the grating-shaped bumper 60 (bumper) is attached all over the periphery of the body part 601. The structure itself of the grating-shaped bumper 60 is similar to the structure of the grating-shaped bumper 20 attached to the above-described unmanned carrier 200, and includes a plurality of grating members 61 arranged at intervals. The grating-shaped bumper 60 is formed of a material similar to that of the grating-shaped bumper 20.

In this embodiment, the unmanned carrier 600 is provided with the grating-shaped bumper 60 all over its periphery, unlike the unmanned carrier 200. Specifically, the grating-shaped bumper 60 is fitted in projecting portions 602 and 603 provided on opposite side surfaces of the front part 610 and projecting portions 612 and 613 provided on opposite side surfaces in a rear part of the mounting table 601b. Further, the grating-shaped bumper 60 is fixed at opposite side surfaces in a center portion of the body part 601 by fasteners 62 and 63. Thus, it is possible to detect a contact or a collision from the rear side of the unmanned carrier 600 or a contact or a collision during rearward traveling of the unmanned carrier 600. The fixing structure of the grating-shaped bumper 60 using the projecting portions 602, 603, 612, and 613 will be described in more detail later.

The LRFs 65 and 66 (obstruction sensor) are sensors having functions equal to those of the above-described LRF 15. The LRF 65 is disposed near one corner portion on the bottom plate portion 601c of the body part 601 (a front end of the unmanned carrier 600), and the LRF 66 is set near one corner portion of the mounting table 601b to be diagonally opposite to the LRF 65 (a rear end of the unmanned carrier 600). The LRFs 65 and 66 are disposed at positions of the same height. Although not illustrated, the unmanned carrier 600 further includes a control system having a function equal to that of the control system illustrated in FIG. 3. The LRFs 65 and 66 perform an obstruction detecting operation by combination with the control system.

With the above-described structure, as shown by broken lines in FIG. 14, the LRFs 65 and 66 perform the detecting operation by emitting laser light and receiving reflected light in their respective scan regions to be covered. Thus, existence of an obstruction can be detected all over the periphery of the unmanned carrier 600 during traveling. Moreover, even when an unexpected obstruction or an obstruction suddenly appearing comes into contact with any position on the entire periphery of the unmanned carrier 600, the contact can be detected and the unmanned carrier 600 can be stopped.

As illustrated in FIG. 15, the interval of the grating members 61 in the grating-shaped bumper 60 is set to increase with increasing distance from the vicinities of the LRFs 65 and 66. Since a light transmitting region (opening) between the adjacent grating members 61 is narrow at positions located far from the LRFs 65 and 66, laser light may be unlikely to be sufficiently applied around the unmanned carrier 600. For this reason, at the positions located far from the LRFs 65 and 66, the interval between the adjacent grating members 61 is set wide so that the laser light is sufficiently applied around the unmanned carrier 600, similarly to the vicinities of the LRFs 65 and 66.

Specifically, in an area 651 around the LRF 65 and an area 652 around the LRF 66 each shown by a one-dot chain line in FIG. 15, the pitch (interval) between the grating members 61 is set at a first pitch that is narrow and fixed. In the other areas, the pitch is set at a second pitch that is fixed and about twice as wide as the first pitch.

Thus, laser light can be sufficiently applied around the unmanned carrier 600 even at the positions located far from the LRFs 65 and 66.

While two types of pitches, that is, the first pitch in the area 651 and the area 652 and the second pitch wider than the first pitch in the other areas are set in this embodiment, the present invention is not limited thereto. For example, the interval between the grating members 61 may be set to gradually increase with increasing distance from the vicinities of the LRFs 65 and 66.

Here, a description will be given of the projecting portions 602, 603, 612, and 613 for attaching the grating-shaped bumper 60 to the unmanned carrier 600. FIG. 16(a) is a front view illustrating the arrangement relationship between the projecting portions 602 and 612 and the grating members 61, and FIG. 16(b) is a cross-sectional view taken along line A-A of FIG. 16(a). FIG. 17(a) is a front view illustrating the arrangement relationship between the projecting portions 603 and 613 and the grating members 61, and FIG. 17(b) is a cross-sectional view taken along line B-B of FIG. 17(a).

As described above, the projecting portions 602 and 603 are set in the front part of the unmanned carrier 600, and the projecting portions 612 and 613 are set in the rear part of the unmanned carrier 600. The projecting portions 602, 603, 612, and 613 are formed to have the same width. This is not only advantageous in production, but also can stabilize the mounted state of the grating-shaped bumper 60 after attachment.

As illustrated in FIGS. 16(a) and 16(b), three grating members 61 are fitted to the projecting portion 602 or 612. For this reason, opposite side surfaces of the projecting portion 602 or 612 have recesses 602a or 612a in which two grating members 61 disposed on the side surfaces of the projecting portion 602 or 612 are to be fitted. A center portion of a front surface of the projecting portion 602 or 612 has a recess 602b or 612b in which the grating member 61 is to be fitted. Thus, since the projecting portion 602 or 612 is fitted between the grating members 61 when the grating-shaped bumper 60 is attached, the grating-shaped bumper 60 is fixed stably.

As illustrated in FIGS. 17(a) and 17(b), two grating members 61 are fitted to the projecting portion 603 or 613. For this reason, two side surfaces of the projecting portion 603 or 613 have recesses 603a or 613a in which two grating members 61 disposed on the side surfaces of the projecting portion 603 or 613 are to be fitted. Thus, since the projecting portion 602 or 612 is fitted between the grating members 61 when the grating-shaped bumper 60 is attached, the grating-shaped bumper 60 is fixed stably.

Since the projecting portion 603 or 613 is fitted with three grating members 61 in the area having the above-described wide second pitch between the grating members 61, it does not have a recess corresponding to the recess 602b or 612b provided in the projecting portion 602 or 612. In contrast, since the projecting portion 602 or 612 is fitted to two grating members 61 in the area having the above-described narrow first pitch between the grating members 61, it has the recess 602b or 612b.

By thus making the fitting structure different by the first pitch and the second pitch, the projecting portions 602, 603, 612, and 613 can be formed with the same width. Here, the projecting portions 602, 603, 612, and 613 are preferably formed of synthetic rubber that is a material similar to that of the grating-shaped bumper 60.

Laser light from the LRFs passes through spaces under the projecting portions 602, 603, 612, and 613, and is applied around the unmanned carrier 600.

[Example Realized by Software]

The control system illustrated in FIG. 3 (in particular, the body-operation control unit 80) may be realized by a logic circuit (hardware) provided in, for example, an integrated circuit (IC chip) or may be realized by software using a CPU (Central Processing Unit).

In the latter case, the body-operation control unit 80 includes, for example, a CPU that executes instructions of a program serving as software for implementing functions of an obstruction detection system based on the obstruction detection method of the present invention, a ROM (Read Only Memory) or a storage device (these are referred to as a "recording medium") in which the program and various data are recorded readably by a computer (or CPU), and a RAM (Random Access Memory) that develops the program.

The computer (or CPU) reads and executes the program from the recording medium, so that the object of the present invention is achieved. As the recording medium, "a concrete medium that is not temporary", for example, a tape, a disk, a card, a semiconductor memory, or a programmable logic circuit can be used. The program may be supplied to the computer via an arbitrary transmission medium that can transmit the program (for example, a communication network or a broadcast wave). The present invention can also be realized in the form of a data signal that is embodied by electronic transmission of the program and that is embedded in a carrier wave.

CONCLUSION

An obstruction detection method for a mobile body according to a first mode of the present invention is an obstruction detection method for a mobile body by which a mobile body (unmanned carriers 100, 200, 300, and 400 and a robot 500) including a bumper (grating-shaped bumpers 10, 20, 30, 40, and 60 and bumper 50) having elasticity and an obstruction sensor (LRFs 15, 65, 66) configured to perform a detecting operation based on light that an irradiated object is irradiated with and light reflected from the irradiated object detects existence of an obstruction around the mobile body and contact of the obstruction with the mobile body. A common processing system (received-signal detection circuit 70, body-operation control unit 80, and storage unit 90) performs first detection processing that detects the existence of the obstruction by determining, based on a detection output from the obstruction sensor, whether or not the irradiated object existing around the mobile body is an obstruction, and second detection processing that detects the contact of the obstruction with the mobile body by determining, based on a detection output from the obstruction sensor, presence or absence of deformation of the bumper when the bumper is specified as the irradiated object.

An obstruction detection system for a mobile body according to a second mode of the present invention is an obstruction detection system for a mobile body that detects the existence of an obstruction around the mobile body and the contact of the obstruction with the mobile body according to the obstruction detection method for the mobile body of the first mode and that includes the processing system.

A mobile body (unmanned carriers 100, 200, 300, 400, and 600 and robot 500) according to a third mode of the present invention is a mobile body which includes a bumper (grating-shaped bumpers 10, 20, 30, 40, and 60 and bumper 50) having elasticity and an obstruction sensor (LRFs 15, 65, and 66) configured to perform a detecting operation based on light that an irradiated object is irradiated with and light reflected from the irradiated object, and which detects the existence of an obstruction around the mobile body and the contact of the obstruction with the mobile body. The mobile body includes a processing system (received-signal detection circuit 70, body-operation control unit 80, and storage unit 90) which commonly performs first detection processing that detects the existence of the obstruction by determining, based on a detection output from the obstruction sensor, whether or not the irradiated object existing around the mobile body is an obstruction and second detection processing that detects the contact of the obstruction with the mobile body by determining, based on a detection output from the obstruction sensor, presence or absence of deformation of the bumper when the bumper is specified as the irradiated object.

According to the above-described structures, light emitted from the mobile body is applied to the irradiated object. At this time, when the irradiated object is at a distance such that the irradiated object is not included in a predetermined obstruction detection range, it is determined that the irradiated object is not an obstruction. When the irradiated object is an obstruction that does normally not exist on a traveling route of the mobile body, since light applied to the obstruction and reflected light thereof travel to the irradiated object in different directions and for different distances, for example, it is determined from the differences by the first detection processing that the irradiated object is an obstruction, and as a result, the existence of the obstruction can be detected.

On the other hand, when light is also applied to the bumper, the bumper can be treated as an irradiated object. Accordingly, for example, when the existence or absence of deformation of the bumper is determined by the second detection processing from the difference between light applied to the bumper in a normal state (shape) and reflected light thereof and light applied to a deformed bumper and reflected light thereof and deformation is found as a result, the contact of the obstruction with the bumper can be detected.

Since the first detection processing and the second detection processing are performed by the common processing system, there is no need to prepare separate processing systems exclusive to each detection processing operations. Therefore, it is possible to simplify the structure for detecting the obstruction.

According to the structure of the obstruction detection system, since the first detection processing and the second detection processing are performed by the common processing system, as described above, the structure of the obstruction detection system can be simplified.

A mobile body according to a fourth mode of the present invention, based on the third mode, the bumper may include columnar members (grating members G1 to Gn and grating members 23, 33, 43, 51, and 61) arranged at intervals in a longitudinal direction of the bumper, and the obstruction sensor may be disposed behind the bumper.

According to the above-described structure, light applied to the columnar members and reflected light thereof can be used for the second detection processing, and light passing between the columnar members and reflected light thereof can be used for the first detection processing.

In a mobile body according to a fifth mode of the present invention, based on the fourth mode, the columnar members may be arranged at equal intervals.

According to the above-described structure, it is unnecessary to adjust the interval of the columnar members, and the bumper can be produced easily.

In a mobile body according to a sixth mode of the present invention, based on the fourth mode, the columnar members may be arranged so that the intervals increase with increasing distance from the obstruction sensor.

According to the above-described structure, when the obstruction sensor needs to be disposed close to the bumper, light from the obstruction sensor easily passes in the lateral direction because the interval of the columnar members is wider in a corner portion of the mobile body. Hence, the light irradiation range can be widened.

In a mobile body according to a seventh mode of the present invention, based on the fourth mode, the bumper may be fixed at both end portions to side surfaces of the mobile body, and may be fitted to a projecting portion provided in the mobile body at a predetermined position between the end portions.

According to the above-described structure, a portion of the bumper fitted to the projecting portion overhangs from the mobile body in accordance with the projection amount of the projecting portion. Thus, even when the obstruction comes into contact with an area of the bumper out of the light irradiation range, deformation due to the contact also appears in the light irradiation range of the bumper.

In a mobile body according to an eighth mode of the present invention, based on the seventh mode, the projecting portion may be formed of an elastic material.

According to the above-described structure, since the projecting portion elastically deforms, the bumper can be easily fitted to the projecting portion.

A structural member according to a ninth mode of the present invention includes a long frame and columnar members arranged at intervals in a longitudinal direction of the frame.

A bumper according to a tenth mode of the present invention may be formed by the structural member of the ninth mode.

According to the above-described structure, it is possible to provide the bumper to be applied to the above-described mobile body.

The present invention is not limited to the above-described embodiments, and various modifications can be made within the scope of the claims. An embodiment obtained from proper combination of technical means disclosed in different embodiments is encompassed in the technical scope of the present invention. Moreover, a new technical feature can be made by combining technical means disclosed in different embodiments.

INDUSTRIAL APPLICABILITY

The present invention can be utilized, in an AGV such as an unmanned carrier, to detect the traveling direction of the AGV and existence of a surrounding obstruction and to detect contact of the AGV with the obstruction.

REFERENCE SIGNS LIST

10, 20, 30, 40, 60 grating-shaped bumper
15, 65, 66 LRF (obstruction sensor)
16, 17 obstruction
20 grating-shaped bumper (bumper)
23 grating member (columnar member)
50 bumper
70 received-signal detection circuit (processing system)
80 body-operation control unit (processing system)
90 storage unit (processing system)
100, 200, 300, 600 unmanned carrier (mobile body)
500 robot (mobile body)
G1 to Gn grating member

The invention claimed is:

1. An obstruction detection method for a mobile body by which a mobile body including a bumper having elasticity and an obstruction sensor configured to perform a detecting operation based on light that an irradiated object is irradiated with and light reflected from the irradiated object detects existence of an obstruction around the mobile body and contact of the obstruction with the mobile body, wherein a common processing system performs first detection processing that detects the existence of the obstruction by determining, based on a detection output from the obstruction sensor, whether or not the irradiated object existing around the mobile body is an obstruction and second detection processing that detects the contact of the obstruction with the mobile body by determining, based on a detection output from the obstruction sensor, presence or absence of deformation of the bumper when the bumper is specified as the irradiated object;

wherein the bumper includes a light transmitting portion that allows passage of light and a light blocking portion that blocks light, and the obstruction sensor is configured to (i) detect the obstruction based on light reflected from the irradiated object and passed through the light transmitting portion and (ii) detect the deformation of the bumper based on light reflected at the light blocking portion.

2. An obstruction detection system for a mobile body that detects existence of an obstruction around the mobile body and contact of the obstruction with the mobile body by the obstruction detection method for the mobile body according to claim 1, wherein the obstruction detection system for the mobile body includes the processing system.

3. A mobile body which comprises a bumper having elasticity and an obstruction sensor configured to perform a detecting operation based on light that an irradiated object is irradiated with and light reflected from the irradiated object and which detects existence of an obstruction around the mobile body and contact of the obstruction with the mobile body, wherein the mobile body further comprises a processing system that commonly performs first detection processing that detects the existence of the obstruction by determining, based on a detection output from the obstruction sensor, whether or not the irradiated object existing around the mobile body is an obstruction and second detection processing that detects the contact of the obstruction with the mobile body by determining, based on a detection output from the obstruction sensor, presence or absence of deformation of the bumper when the bumper is specified as the irradiated object;

wherein the bumper includes a light transmitting portion that allows passage of light and a light blocking portion that blocks light, and the obstruction sensor is configured to (i) detect the obstruction based on light reflected from the irradiated object and passed through the light transmitting portion and (ii) detect the deformation of the bumper based on light reflected at the light blocking portion.

4. The mobile body according to claim 3, wherein the bumper includes columnar members arranged at intervals in a longitudinal direction of the bumper, and wherein the obstruction sensor is disposed behind the bumper.

5. The mobile body according to claim 4, wherein the columnar members are arranged at equal intervals.

6. The mobile body according to claim 4, wherein the columnar members are arranged so that the intervals increase with increasing distance from the obstruction sensor.

7. The mobile body according to claim 4, wherein the bumper is fixed at both end portions to side surfaces of the mobile body, and is fitted to a projecting portion provided in the mobile body at a predetermined position between the end portions.

8. The mobile body according to claim 7, wherein the projecting portion is formed of an elastic material.

* * * * *